Patented June 5, 1951

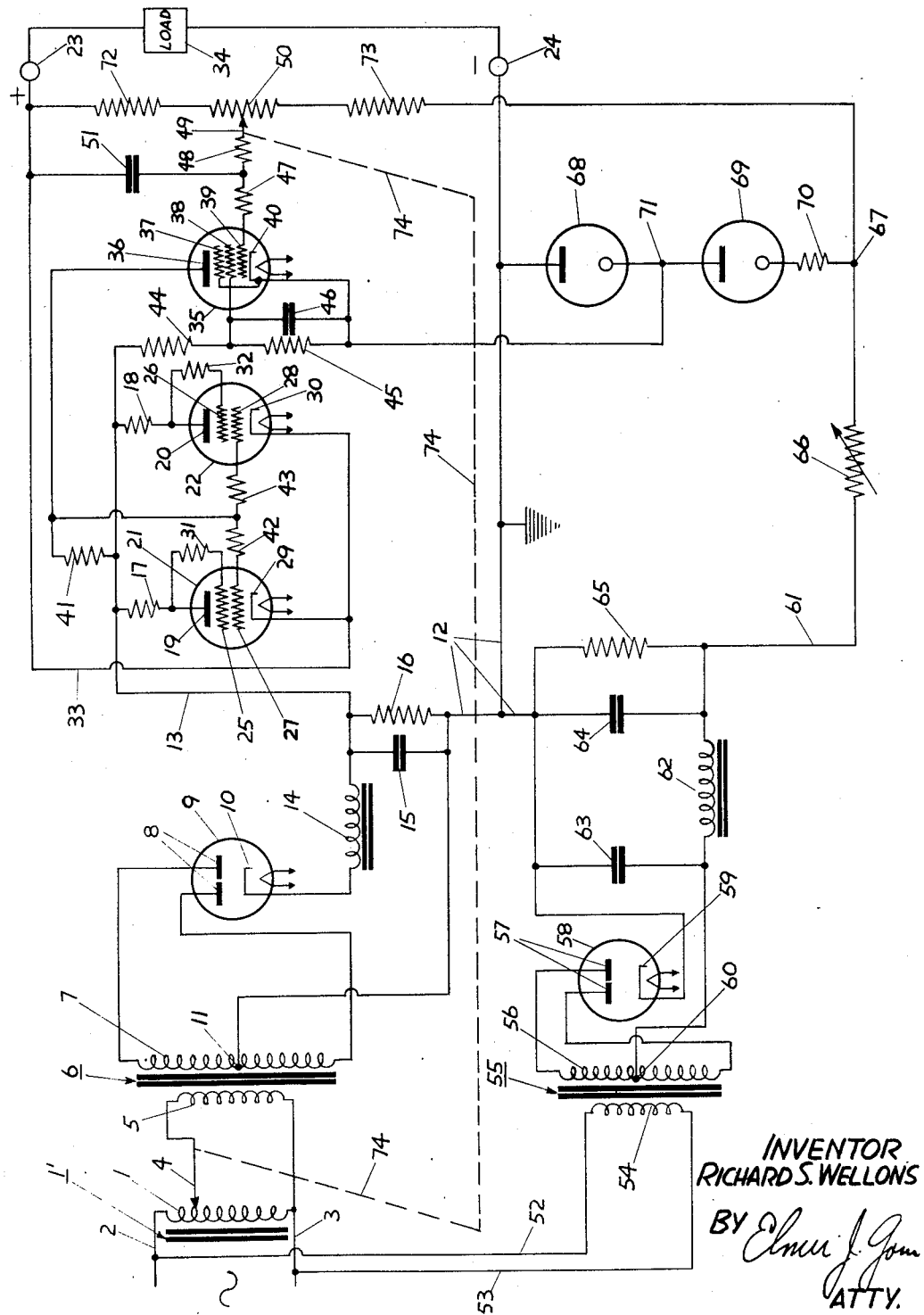

2,556,129

UNITED STATES PATENT OFFICE 2,556,129

ELECTRICAL CIRCUITS

Richard S. Wellons, Belmont, Mass., assignor to Raytheon Manufacturing Company, Newton, Mass., a corporation of Delaware Application March 28, 1946, Serial No. 657,692

12 Claims. (Cl. 321—23)

This invention relates to electrical circuits, and more particularly to a regulated direct current power supply.

An object of this invention is to provide a power supply the output voltage of which is continuously variable from zero to full voltage.

Another object is to devise a direct current power supply which has good voltage regulation from full output current to zero output current.

A further object is to devise a power supply which has improved regulation at low voltage outputs.

Another object is to provide a power supply which will supply large amounts of power, without the necessity of providing large numbers of high-power electron discharge tubes therein.

A further object is to devise a direct current power supply in which alternating current line voltage variations will cause no appreciable output fluctuations over substantially the full output voltage range of the supply.

The foregoing and other objects of the invention will be best understood from the following description of an exemplification thereof, reference being had to the accompanying drawing, wherein the single figure represents diagrammatically one embodiment of the invention.

Referring to the drawing, a source of alternating current is connected to opposite ends of winding 1 of a continuously-variable autotransformer 1' by means of conductors 2 and 3. The voltage appearing between adjustable tap 4 on winding 1 and conductor 3 is applied across primary winding 5 of input transformer 6. Secondary winding 7 of transformer 6 has its two end terminals connected to separate anodes 8 of a full-wave diode rectifier tube 9, which also includes a common cathode 10 which may be of the indirectly-heated type as indicated. Midtap 11 on the secondary winding 7 is connected to lead 12 which may be grounded and which serves as the negative output lead. The output of the above rectifier portion may be taken off between leads 12 and 13, cathode 10 being connected to leads 12 and 13 through a smoothing filter which comprises a series inductance 14, a shunt capacitance 15, and a shunt resistance 16. Lead 13 is connected, through resistors 17 and 18 of small value, to the respective anodes 19 and 20 of a pair of similar tubes 21 and 22 connected in parallel. These tubes, as shown, may conveniently be tetrodes, having, in addition to the anodes, respective screen grids 25 and 26, control grids 27 and 28, and indirectly-heated cathodes 29 and 30. Screen grids 25 and 26 are connected through respective resistors 31 and 32 to the respective anodes 19 and 20. The two cathodes 29 and 30 are connected together and to lead 33, which serves as the positive output lead of the system. It will therefore be seen that tubes 21 and 22 are connected in parallel with each other, and the anode-cathode path of each of said tubes is in series in the circuit between the rectifier 9 and the positive output lead 33. These tubes may therefore be termed the series tubes, and they may alternatively be termed the regulator tubes, since they perform a regulating function, as hereinafter described. Two or more tubes may be used, rather than one, solely in order to enable more power to be transmitted to the load.

A control tube 35, shown as a pentode, is provided. This tube includes anode 36, suppressor grid 37, screen grid 38, control grid 39, and indirectly-heated cathode 40. Anode 36 is connected, through a high resistance 41 to lead 13 and is also connected, through separate low resistances 42 and 43, respectively, to respective control grids 27 and 28. Suppressor grid 37 is tied to cathode 40. Screen grid 38 is connected through a relatively high resistance 44 to lead 13, and said grid 38 is also connected through a resistance 45, shunted by a condenser 46, to cathode 40. Control grid 39 is connected through a pair of resistors 47 and 48 to a movable contact 49 on a resistor 50. A condenser 51 is connected between lead 33 and the junction of resistors 47 and 48.

The alternating current source is also connected, by means of leads 52 and 53, to opposite ends of primary 54 of transformer 55, the two terminals of the secondary 56 of which are connected to separate anodes 57 of full-wave diode rectifier tube 58 having an indirectly-heated cathode 59. Cathode 59 is connected to lead 12, and the output of the rectifier 58, appearing between cathode 59 and midtap 60 of secondary 56, is connected to leads 12 and 61, a smoothing network consisting of series inductance 62, shunt condensers 63 and 64, and shunt resistance 65 being interposed between tube 58 and leads 12 and 61 as shown. A variable resistance 66 is inserted in series in lead 61 between the smoothing network and terminal 67 of said lead. Two voltage regulator tubes 68 and 69, of the type designed to maintain a voltage of 150 volts between their terminals, are connected in series between lead 12 and terminal 67 of line 61, a small resistance 70 being placed between tube 69 and terminal 67. The common terminal 71 between tubes 68 and 69 is connected to cathode 40. Two fixed resistances 72 and 73 are connected in series with resistance 50, one on each side thereof, and the series combination of resistors 72, 50, and 73 is connected between lead 33 and terminal 67 of lead 61. The positive output terminal 23 is connected to lead 33, while the negative output terminal 24 is connected to lead 12. Load 34 is connected to terminals 23 and 24. Movable contact 49 on resistor 50 is mechanically coupled to adjustable tap 4, as indicated at 74, in such a way that as contact 49 is moved downwardly, tap 4 will be moved upwardly. Contact 49 and resistors 72, 50, and 73 constitute a potentiometer.

In the use of the circuit as a direct current power supply, alternating current from the source is rectified by tube 9 and the filtered direct current is applied through series tubes 21—22 to load 34. It will be seen that the potential of control grid 39 of control tube 35, with respect to its cathode 40, is a resultant of two voltages, the output voltage across terminals 23—24, and a fixed voltage produced across tubes 68 and 69 by rectifier 58. Tubes 21 and 22 act as regulator tubes, acting to keep the output voltage substantially constant with changes in load. If the output voltage of the system tends to fall, due to the increase in the load taken therefrom, the grid 39 of control tube 35 becomes more negative, thus increasing the negative bias on this tube, as a result of the dependence of the potential of grid 39 on the system output voltage. The plate current of tube 35 will be decreased in response to the increase in bias on said tube, thereby increasing the instantaneous plate voltage of said tube. Due to the connection of anode 36 to grids 27 and 28, the negative grid bias of series tubes 21 and 22 will be decreased as a result of the changed plate voltage of tube 35, causing an increase of plate current in these series or regulator tubes, thereby decreasing the total voltage drop across these series tubes and bringing the output voltage substantially back up to its original value because the system output voltage is equal to the rectifier output voltage minus the voltage drop across the series tubes. The converse of the above occurs when the output voltage of the system tends to rise due to a decrease in load. Thus it will be seen that good load regulation is provided by the circuit of this invention.

When it is desired to increase the output voltage of the system, movable contact 49 of the output voltage-control potentiometer 72, 50, 73 is moved downwardly on resistor 50. This makes the potential on grid 39 of control tube 35 more negative with respect to its cathode, since it varies the relative proportion of the fixed voltage, provided across tubes 68—69, which is applied to said grid. As a result of this increase of negative bias, the plate current of the control tube 35 will be reduced, decreasing the negative potential on grids 27 and 28 of series tubes 21 and 22. This decrease of negative bias on series tubes 21 and 22 will produce a greater current flow therein, decreasing the voltage drop across said tubes and increasing the output voltage. A new point of equilibrium will be reached, at which the grid 39 of the control tube 35 will be slightly more negative than it was before contact 49 was moved, and at which the grids 27 and 28 of series tubes 21 and 22 will be considerably more positive than they were before contact 49 was moved, and the higher output voltage will continue to be supplied from the system.

The rectifier 58 and tubes 68 and 69 provide a low current supply to bring the cathode 40 of control tube 35 down to a potential of 150 volts negative with respect to ground. This allows the output voltage of the system to be continuously varied down to zero volts. If such a source were not provided, cutoff bias for the series tubes would be reached, under conditions of no load, at comparatively high output voltages, and low output voltages could not be obtained with the system because of cutoff of the series tubes.

The input to the rectifier plate or input transformer 6 is made variable by means of a continuously-variable autotransformer 1′, the adjustable tap 4 of which is mechanically coupled, as at 74, to the movable contact 49 on the output voltage-control potentiometer 72, 50, 73, in such a way that the voltage input to the rectifier 9 will be varied in direct proportion to the variation of system output voltage; that is, when the system output voltage is decreased, the input voltage will also be decreased and when the system output voltage is increased, the input voltage will also be increased. As the output voltage of the system is decreased, due to the increase of grid bias on series tube 21 and 22, the voltage drop across these tubes may become excessive. This means that, for a certain wattage, since wattage is the limiting factor for the tubes, the allowable current through the series tubes would be small. Therefore if the voltage drop across series tubes 21—22 is held within reasonable limits, or if only the minimum variation of voltage drop necessary for proper load regulation is permitted, higher currents may be passed through the series tubes. In the system of this invention, the voltage drop across the series tubes is maintained substantially constant by means of the mechanical coupling of tap 4 and contact 49. It will be seen that the output voltage of the system is equal to the voltage applied to the anodes of the series tubes minus the voltage drop across these tubes, and that the voltage applied to the anodes of these tubes may be varied by varying the input to the anodes of rectifier 9 thus varying its output voltage. Therefore, if the voltage applied to the anodes of these tubes is varied (this being accomplished indirectly by movement of tap 4) directly with the variation of system output voltage (which is accomplished by movement of contact 49), the voltage drop across the series tubes may be maintained substantially constant, variations of said voltage drop being necessary only for purposes of load regulation. As a result of this substantially constant voltage drop across the series tubes, higher current may be passed through said tubes.

The mechanical coupling of tap 4 and contact 49 provides another advantage. As will be apparent, the load regulation of the system depends on the gain of tube 35 and the mutual conductance or transconductance, $g_m$, of tubes 21 and 22. When the voltage drop across the series tubes 21 and 22 is excessive, as would normally be the case at low system output voltages if the mechanical coupling 74 were not provided, these tubes would be operating almost at cutoff, their $g_m$ would be low, and as a result their regulating action would be poor. However, with mechanical coupling 74 linking together tap 4 and contact 49 so that the input voltage to the series tubes is lowered coincident with decreasing output voltage, a more nearly constant $g_m$ operation of the series tubes is obtained, the series tubes are kept operating on the more favorable portion of their $g_m$ characteristics (that is, where their $g_m$ is high), and good regulating action is obtained even at low output voltages.

The system also provides a compensating effect for line voltage variations, and this effect can be adjusted so that line voltage variations in a particular direction will cause the system output voltage to increase, decrease, or stay constant. The voltage of screen grid 38 of control tube 35 is obtained from the line by way of lead 13, and grid 38 is connected to the line in such a way that when the line voltage decreases, the voltage on screen grid 38 will also be decreased. This change in screen voltage will reduce the plate current of tube 35, which will in turn decrease the negative grid bias of series tubes 21 and 22. This decrease of grid bias on the series tubes will cause an increase of plate current in these tubes, decreasing the total voltage drop across these tubes and changing the system output voltage accordingly. By proper choice of the circuit constants, the line voltage variations may be made to have the desired effect on the system output voltage, and, if desired, this compensation may be made such that line voltage variations of as much as 10 volts will cause no appreciable output voltage fluctuations over the range from full system output voltage down to approximately 25 volts, for example, and of the order of 0.2 volt fluctuation for system output voltages below 25 volts.

The plate voltage for control tube 35 is obtained from the main power supply 9, while its cathode potential is obtained from the separate low current power supply 58, 68, 69. The plate voltage of series tubes 21, 22 is the difference between the output voltage of rectifier 9 and the load voltage 23—24, as is apparent from the drawing.

Of course, it is to be understood that this invention is not limited to the particular details as described above, as many equivalents will suggest themselves to those skilled in the art. For example, other types of tubes than those illustrated might be used, and/or suitable tubes with filamentary-type cathodes could be used. Various other variations will suggest themselves. It is accordingly desired that the appended claims be given a broad interpretation commensurate with the scope of this invention within the art.

What is claimed is:

1. A direct current power supply comprising a rectifier having an input circuit and an output circuit, first variable means connecting said input circuit to a source of alternating current, an electron discharge tube having at least anode, cathode, and grid elements, means connecting the anode-cathode path of said tube in series in said output circuit, second variable means connected across said output circuit, means connecting the variable portion of said second variable means to said grid element and means mechanically connecting together the variable portions of said first and second variable means.

2. A direct current power supply comprising a rectifier having an input circuit and an output circuit, variable voltage means connecting said input circuit to a source of alternating current, an electron discharge tube having at least anode, cathode, and grid elements, means connecting the anode-cathode path of said tube in series in said output circuit, variable resistance means connected across said output circuit whereby the output voltage of said supply may be varied, means connecting the variable portion of said variable resistance means to said grid element, and connecting means mechanically connecting together the variable portions of said variable voltage means and said variable resistance means, said connecting means being so arranged that the input voltage applied to said rectifier will be varied in the same relative direction as the output voltage of said supply.

3. A direct current power supply comprising a rectifier having an input circuit and an output circuit, a continuously-variable autotransformer including an adjustable tap, connecting said input circuit to a source of alternating current, an electron discharge tube having at least anode, cathode, and grid elements, means connecting the anode-cathode path of said tube in series in said output circuit, potentiometer means connected across said output circuit whereby the output voltage of said supply may be varied, means connecting the movable contact of said potentiometer to said grid element, and means mechanically connecting together the movable contact of said potentiometer and the adjustable tap of said autotransformer, said last means being so arranged that the input voltage applied to said rectifier will be varied in the same relative direction as the output voltage of said supply.

4. A direct current power supply, which comprises a rectifier having an input circuit and an output circuit, a continuously-variable autotransformer including an adjustable tap connecting said input circuit to a source of alternating current, a first electron discharge tube having at least anode, cathode, and grid elements, means connecting the anode-cathode path of said tube in series in said output circuit, a second electron discharge tube having at least anode, cathode, and grid elements, potentiometer means connected across said output circuit, means connecting the movable contact of said potentiometer to the grid element of said second tube, means connecting the anode of said second tube to the grid of said first tube to vary the potential thereon in response to movements of said contact, and means mechanically connecting together the movable contact of said potentiometer and the adjustable tap of said autotransformer, said last means being so arranged that the input voltage applied to said rectifier will be varied in the same relative direction as the output voltage of said supply.

5. A direct current power supply, which comprises a rectifier having an input circuit and an output circuit, a continuously-variable autotransformer including an adjustable tap connecting said input circuit to a source of alternating current, a first electron discharge tube having at least anode, cathode, and grid elements, means connecting the anode-cathode path of said tube in series in said output circuit, a second electron discharge tube having at least anode, cathode, and grid elements, a load device connected across said output circuit, potentiometer means connected across said output circuit between said load device and said first tube, means connecting the movable contact of said potentiometer to the grid element of said second tube, means connecting the anode of said second tube to the grid of said first tube in such a manner that when said movable contact is moved in the direction to increase the negative potential on the grid of said second tube the voltage drop across said first tube will be decreased, thereby increasing the output voltage of said supply, and means mechanically connecting together the movable contact of said potentiometer and the adjustable tap of said autotransformer, said last means being so arranged that the input voltage applied to said rectifier will be varied in the same relative direction as the output voltage of said supply.

6. A direct current power supply comprising a rectifier having an output circuit, an electron discharge tube having at least anode, cathode, and grid elements, means connecting the anode-cathode path of said tube in series in said output circuit, variable means connected across said output circuit, means connecting the variable portion of said variable means to said grid element whereby the voltage drop across the anode-cathode circuit of said tube tends to vary in response to variation of said variable means, and means for maintaining said voltage drop substantially constant irrespective of variation of said variable means.

7. A direct current power supply comprising a rectifier having an output circuit, an electron discharge tube having at least anode, cathode, and grid elements, means connecting the anode-cathode path of said tube in series in said output circuit, variable means connected across said output circuit, means connecting the variable portion of said variable means to said grid element in such a manner that in response to variation of said variable means in a certain direction the voltage drop across the anode-cathode circuit of said tube tends to become excessive, and means for limiting said voltage drop irrespective of variation of said variable means in said direction.

8. A voltage regulated power supply for supplying a regulated adjustable direct current voltage output including a transformer with an adjustable tap adapted to supply a variable alternating current voltage, means for rectifying said alternating current voltage, a current-regulating vacuum tube having a grid bias circuit disposed between said rectifying means and said regulated direct current voltage output, a control tube in the grid bias circuit of said current regulating tube for controlling the grid bias potential of the latter tube, said bias potential being a function of the grid bias potential of said control tube, a potentiometer for controlling the grid bias potential of said control tube, and means mechanically connecting the movable contact of said potentiometer to the adjustable tap of said transformer whereby they may be adjusted simultaneously.

9. A voltage regulated power supply for supplying a regulated adjustable direct current voltage output including an unregulated direct current voltage input, voltage control means for varying said unregulated direct current voltage input, rectifier means disposed between said voltage control means and said unregulated direct current voltage input a current-regulating tube disposed between said unregulated direct current voltage input and said regulated voltage output and means for varying the grid bias of said current regulating tube, said means being ganged together with said voltage control means.

10. A voltage regulated variable power supply comprising an alternating current input, means to vary the magnitude of said input, means to rectify said input, a regulated direct-current voltage output, a grid biased current regulator tube serially connected between said regulated output and the rectified input, a control tube connected in the grid bias circuit of said current regulator tube to regulate the current flow through said current regulator, and means connected in shunt with said regulated output to control the current flow through said control tube, said latter means being ganged with the means to vary the alternating-current input.

11. A regulated power supply having a first adjustable means to vary an unregulated input thereto, a voltage divider, variable current flow means serially connected between said variable input means and said divider, and a second adjustable means to produce a voltage that varies as the amplitude of the voltage across said divider for varying said current flow means, said first and second adjustable means being ganged.

12. A voltage regulator including an alternating-current input source, means to vary the output thereof, means to rectify the output thereof, a biased current regulating tube serially connected between the rectified output and a voltage divider, and a control tube having means for controlling the grid bias of said first tube as a function of the amplitude of the voltage across said divider, said last mentioned means being ganged with the first mentioned means.

RICHARD S. WELLONS.

REFERENCES CITED

The following references are of record in the file of this patent:

UNITED STATES PATENTS

| Number | Name | Date |
|--------|------|------|
| 1,849,518 | Gay | Mar. 15, 1932 |
| 2,030,107 | Gulliksen | Feb. 11, 1936 |
| 2,117,138 | Bock | May 10, 1938 |